(12) United States Patent
Kang

(10) Patent No.: US 11,916,585 B2
(45) Date of Patent: Feb. 27, 2024

(54) ELECTRONIC DEVICE INCLUDING ANTENNA

(71) Applicant: Samsung Electronics Co., Ltd., Gyeonggi-do (KR)

(72) Inventor: Myeongkoo Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 55 days.

(21) Appl. No.: 17/666,057

(22) Filed: Feb. 7, 2022

(65) Prior Publication Data
US 2022/0158684 A1    May 19, 2022

Related U.S. Application Data

(63) Continuation of application No. PCT/KR2020/010396, filed on Aug. 6, 2020.

(30) Foreign Application Priority Data

Aug. 6, 2019 (KR) .......................... 10-2019-0095778

(51) Int. Cl.
*H04B 1/40* (2015.01)

(52) U.S. Cl.
CPC ....................................... *H04B 1/40* (2013.01)

(58) Field of Classification Search
CPC .......... H04B 1/38; H04B 1/385; H04B 10/40; H04B 1/3827; H04B 5/0031;
(Continued)

(56) References Cited

U.S. PATENT DOCUMENTS

2013/0102357 A1    4/2013 Vance
2013/0234903 A1    9/2013 Kwak et al.
(Continued)

FOREIGN PATENT DOCUMENTS

CN    105322295    2/2016
CN    109273830    1/2019
(Continued)

OTHER PUBLICATIONS

Korean Office Action dated Aug. 4, 2023 issued in counterpart application No. 10-2019-0095778, 8 pages.
(Continued)

*Primary Examiner* — Ajibola A Akinyemi
(74) *Attorney, Agent, or Firm* — The Farrell Law Firm, P.C.

(57) ABSTRACT

An antenna and an electronic device including an antenna are provided. The electronic device includes a housing including a conductive member; a wireless communication circuit; a circuit board; a first conductive path arranged on at least one part of the circuit board and electrically connected to the wireless communication circuit; a capacitor arranged on the first conductive path; a second conductive path electrically connected to the first conductive path between the wireless communication circuit and the capacitor and arranged on at least one part of the circuit board; a first
(Continued)

conductive pad electrically connected to the first conductive path; a second conductive pad electrically connected to the second conductive path and coupled with the first conductive pad; and a conductive connection member for electrically connecting the first conductive pad and the conductive member. The conductive member can be configured to resonate at a first frequency band or at a second frequency band that is higher than the first frequency band.

16 Claims, 11 Drawing Sheets

(58) Field of Classification Search
CPC .... H04B 5/0037; H04B 1/3838; H04B 7/005; H04B 7/04; H04B 1/0458; H04B 1/06; H04B 1/18; H04B 2001/3866; H04B 2203/5483; H04B 3/03; H04B 3/56; H04B 5/0081; H04B 1/0057; H04B 1/006; H04B 1/086; H04B 1/3818; H04B 1/3888; H04B 10/801; H04B 11/00; H04B 2001/3855; H04B 2001/3894
USPC .......................................................... 455/73
See application file for complete search history.

(56) References Cited

U.S. PATENT DOCUMENTS

| | | |
|---|---|---|
| 2016/0329629 A1 | 11/2016 | Park et al. |
| 2017/0125887 A1 | 5/2017 | Park et al. |
| 2017/0142241 A1* | 5/2017 | Kim ...................... H04M 1/026 |
| 2017/0244818 A1* | 8/2017 | Kim ...................... H01Q 5/335 |
| 2019/0252766 A1* | 8/2019 | Jeon ..................... H04M 1/0262 |
| 2019/0334225 A1 | 10/2019 | Lee et al. |
| 2019/0341688 A1* | 11/2019 | Kim ...................... H01Q 1/243 |

FOREIGN PATENT DOCUMENTS

| | | |
|---|---|---|
| KR | 1020130103169 | 9/2013 |
| KR | 1020170051064 | 5/2017 |
| KR | 10-2018-0013203 | 2/2018 |

OTHER PUBLICATIONS

International Search Report dated Nov. 9, 2020 issued in counterpart application No. PCT/KR2020/010396, 10 pages.

* cited by examiner

ELECTRONIC DEVICE INCLUDING ANTENNA

CROSS-REFERENCE TO RELATED APPLICATIONS

This application is a Bypass Continuation Application of International Application No. PCT/KR2020/010396, which was filed on Aug. 6, 2020, and is based on and claims priority under 35 U.S.C. § 119 to Korean Patent Application No. 10-2019-0095778, which was filed in the Korean Intellectual Property Office on Aug. 6, 2019, the entire disclosure of each of which is incorporated herein by reference.

BACKGROUND

1. Field

The disclosure relates generally to an antenna and an electronic device including an antenna.

2. Description of Related Art

Electronic devices may output stored information audibly or through images. As electronic devices are highly integrated, and high-speed, high-volume wireless communication has become commonplace, an electronic device, such as a mobile communication terminal, is often equipped with various functions. For example, an electronic device provides an entertainment function, such as playing video games, a multimedia function, such as playing music/videos, a communication and/or security function for mobile banking, and a scheduling and e-wallet function.

An electronic device may communicate with a network using an antenna. Unlike 3rd generation (3G) networks in which a small number of frequency bands (e.g., 900 MHz, 1.8 GHz, 2.1 GHz, etc.) were used globally, post-3G networks (e.g., long term evolution (LTE), LTE-advanced (LTE-A), licensed assisted access (LAA), LTE in unlicensed spectrum (LTE-U), and new radio (NR)) use various frequency bands for each country and/or carrier.

Further, an electronic device may communicate with 2.4 GHz or 5 GHz band Wi-Fi networks as well as cellular networks. Recently launched electronic devices may be equipped with multi-band antennas covering a plurality of frequency bands to support various networks.

An electronic device may include a multi-band antenna supporting a low band (e.g., 700 MHz to 990 MHz), a mid-band (e.g., 1.4 GHz to 2.2 GHz), and a high band (e.g., 2.2 GHz to 6 GHz), and the multi-band antenna may include a plurality of antennas to support the plurality of frequency bands.

More specifically, an electronic device may supply current to the plurality of antennas so that the plurality of antennas form resonance in the plurality of frequency bands. In this case, a main antenna and a sub antenna may be supplied with the current passed through a capacitor. However, if the plurality of antennas do not receive sufficient current, it is difficult to form a stable resonance of the plurality of frequency bands, and thus, the performance of the antennas may be degraded.

SUMMARY

The disclosure has been made to address at least the above-mentioned problems and/or disadvantages and to provide at least the advantages described below.

An aspect of the disclosure is to provide an electronic device including an antenna capable of enhancing radiation efficiency by receiving a stable current to form stable resonance in various frequency bands.

In accordance with an aspect of the disclosure, an electronic device is provided, which includes a housing including a conductive member, a wireless communication, a circuit board, a first conductive path disposed on at least a portion of the circuit board and electrically connected with the wireless communication circuit, a first capacitor disposed on the first conductive path, a second conductive path disposed on at least a portion of the circuit board and electrically connected with the first conductive path between the wireless communication circuit and the first capacitor, a first conductive pad electrically connected with the first conductive path, a second conductive pad electrically connected with the second conductive path and coupled with the first conductive pad. The conductive member may be configured to resonate in a first frequency band or a second frequency band higher than the first frequency band.

In accordance with another aspect of the disclosure, an electronic device is provided, which includes a housing including a first conductive member, a wireless communication circuit, a circuit board, a first conductive path disposed on at least a portion of the circuit board and electrically connected with the wireless communication circuit, a first capacitor disposed on the first conductive path, a second conductive path disposed on at least a portion of the circuit board and electrically connected with the first conductive path between the wireless communication circuit and the first capacitor, a second capacitor disposed on the second conductive path, a second conductive member electrically connected to the second conductive path, and a conductive connection member electrically connecting the first conductive member and a first conductive pad electrically connected to the first conductive path. The first conductive member may be configured to resonate in a first frequency band. The second conductive member may be configured to resonate in a second frequency band.

In accordance with another aspect of the disclosure, an electronic device is provided, which includes a housing first and second conductive members, a wireless communication circuit, a circuit board, a first conductive path disposed on at least a portion of the circuit board and electrically connected with the wireless communication circuit, a first capacitor disposed on the first conductive path, a second conductive path disposed on at least a portion of the circuit board and electrically connected with the first conductive path between the wireless communication circuit and the first capacitor, a second capacitor disposed on the second conductive path, a first conductive connection member electrically connecting the first conductive member and a first conductive pad electrically connected to the first conductive path, and a second conductive connection member electrically connecting the second conductive member and a second conductive pad electrically connected to the second conductive path. The first conductive member may be configured to resonate in a first frequency band or a second frequency band higher than the first frequency band. The second conductive member may be configured to resonate in the second frequency band.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Hereinafter, various embodiments of the disclosure will be described with reference to the attached drawings. However, these embodiments are not intended to limit the disclosure to specific embodiments but construed as including various modifications, equivalents, or alternatives of the embodiments of the disclosure.

Figure 1:
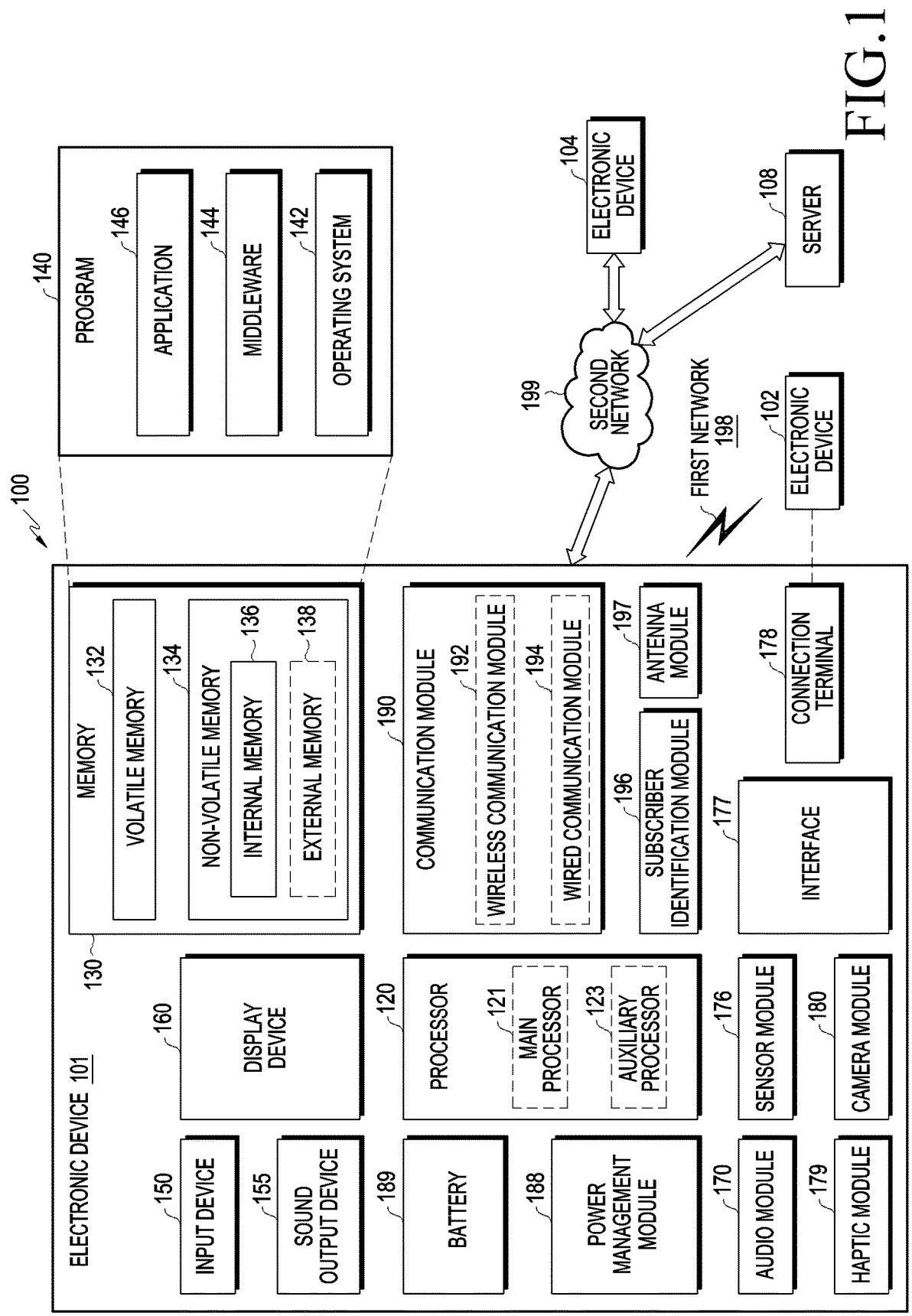
FIG. 1 illustrates an electronic device in a network environment according to an embodiment.

FIG. 1 illustrates an electronic device in a network environment according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 1140) and input data or output data for a command related thereto. The memory 130 may include the volatile memory 132 or the non-volatile memory 134.

The program 1140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (MST)) stored in the SIM 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
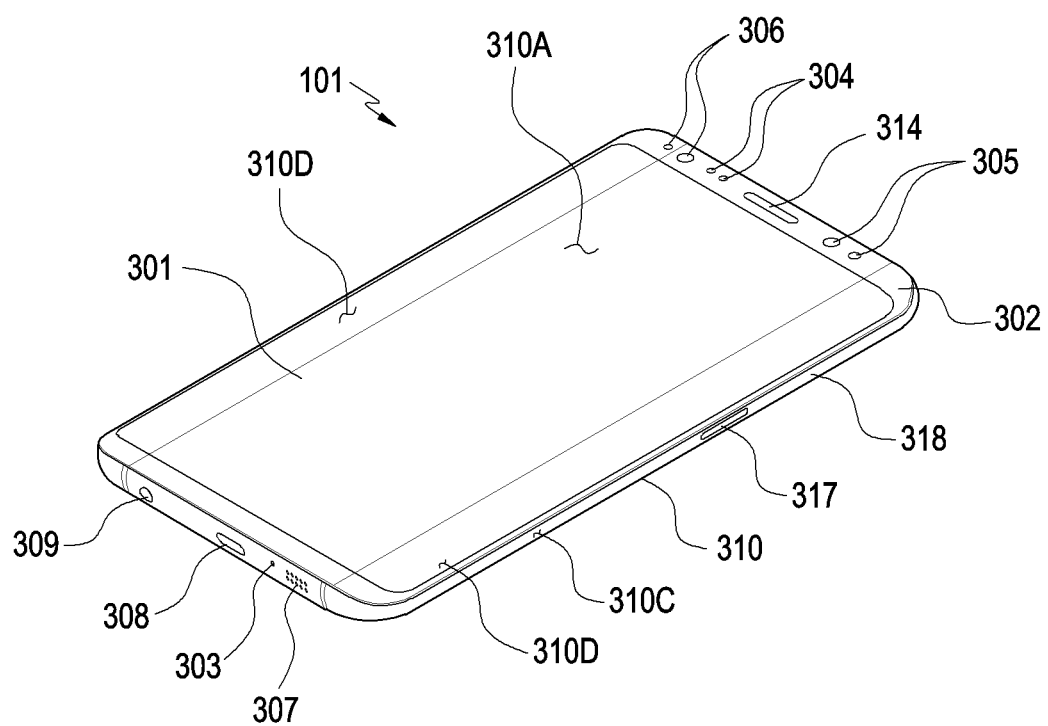
FIG. 2 illustrates a front view of an electronic device according to an embodiment.
Figure 3:
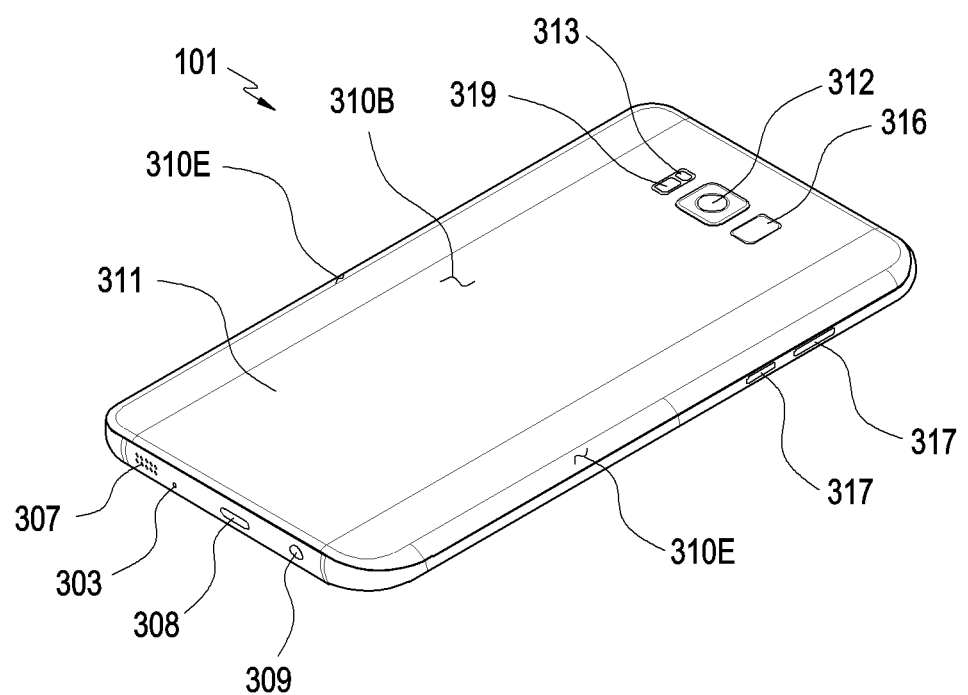
FIG. 3 illustrates a rear view of an electronic device according to an embodiment.

FIG. 2 illustrates a front view of an electronic device according to an embodiment. FIG. 3 illustrates a rear view of an electronic device according to an embodiment.

Referring to FIGS. 2 and 3, the electronic device 101 may include a housing 310 including a first surface (or front surface) 310A, a second surface (or rear surface) 310B, and a side surface (e.g., the side surface 310C of FIGS. 2 and 3) surrounding a space between the first surface 310A and the second surface 310B. Alternatively, the housing 310 may denote a structure forming the first surface 310A, the second surface 310B, and some of the side surfaces 310C.

At least part of the first surface 310A may have a substantially transparent front plate 302 (e.g., a glass plate or polymer plate including various coat layers). The second surface 310B may be formed by a rear plate 311 that is substantially opaque. The rear plate 311 may be formed of laminated or colored glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. The rear plate 311 and the side bezel plate 318 may be integrally formed together and include the same material (e.g., a metal, such as aluminum).

In FIG. 2, the front plate 302 includes two first areas 310D, which seamlessly and bendingly extend from the first surface 310A to the rear plate 311, on both the long edges of the front plate 302. Similarly, in FIG. 3, the rear plate 311 includes two second areas 310E, which seamlessly and bendingly extend from the second surface 310B to the front plate, on both the long edges.

Alternatively, the front plate 302 (or the rear plate 311) may include only one of the first areas 310D (or the second areas 310E, or the first areas 310D or the second areas 301E may partially be excluded.

At side view of the electronic device, the side bezel structure 318 may have a first thickness (or width) for sides that do not have the first areas 310D or the second areas 310E and a second thickness, which is smaller than the first thickness, for sides that have the first areas 310D or the second areas 310E.

The electronic device includes a display 301, audio modules 303, 307, and 314, sensor modules 304, 316, and 319, camera modules 305, 312, and 313, key input devices 317, a light emitting device 306, and connector holes 308 and 309. Alternatively, the electronic device may exclude at least one of the components e.g., the key input device 317 or the light emitting device 306) and/or may add other components.

The display 301 may be exposed through a significant portion of the front plate 302. At least a portion of the display 301 may be exposed through the front plate 302 forming the first surface 310A and the first areas 310D of the side surface 310C. The edge of the display 301 may be formed to be substantially the same in shape as an adjacent outer edge of the front plate 302. Alternatively, an interval between the outer edge of the display 301 and the outer edge of the front plate 302 may remain substantially even to give a larger area of exposure the display 301.

The screen display area of the display 301 may have a recess or opening in a portion thereof, and at least one or more of the audio module 314, sensor module 304, camera module 305, and light emitting device 306 may be aligned with the recess or opening. Alternatively, at least one or more of the audio module 314, sensor module 304, camera module 305, fingerprint sensor 316, and light emitting device 306 may be included on the rear surface of the screen display area of the display 301. The display 301 may be disposed to be coupled with, or adjacent, a touch detecting circuit, a pressure sensor capable of measuring the strength (e.g., pressure) of a touch, and/or a digitizer for detecting a magnetic field-type stylus pen. At least part of the sensor modules 304 and 319 and/or at least part of the key input device 317 may be disposed in the first areas 310D and/or the second areas 310E.

The audio modules 303, 307, and 314 may include a microphone hole 303 and speaker holes 307 and 314. The microphone hole 303 may have a microphone inside to obtain external sounds. There may also be a plurality of microphones to be able to detect the direction of a sound. The speaker holes 307 and 314 may include an external speaker hole 307 and a phone receiver hole 314. The speaker holes 307 and 314 and the microphone hole 303 may be implemented as a single hole, or speakers may be included without the speaker holes 307 and 314 (e.g., piezo speakers).

The sensor modules 304, 316, and 319 may generate an electrical signal or data value corresponding to an internal operating state or external environmental state of the electronic device. The sensor modules 304, 316, and 319 may include a first sensor module 304 (e.g., a proximity sensor) disposed on the first surface 310A of the housing 310, and/or a second sensor module (e.g., a fingerprint sensor), and/or a third sensor module 319 (e.g., a heart-rate monitor (HRM) sensor) disposed on the second surface 310B of the housing 310, and/or a fourth sensor module 316 (e.g., a fingerprint sensor). The fingerprint sensor may be disposed on the second surface 310A as well as on the first surface 310B (e.g., the display 301) of the housing 310. The electronic device may further include sensor modules not shown, e.g., at least one of a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, or an illuminance sensor 304.

The camera modules 305, 312, and 313 may include a first camera device 305 disposed on the first surface 310A of the electronic device, and a second camera device 312 and/or a flash 313 disposed on the second surface 310B. The camera modules 305 and 312 may include one or more lenses, an image sensor, and/or an ISP. The flash 313 may include, e.g., a light emitting diode (LED) or a xenon lamp. Two or more lenses (e.g., an IR camera lens, a wide-angle lens, and a telescopic lens) and image sensors may be disposed on one surface of the electronic device.

The light emitting device 306 may be disposed on the first surface 310A of the housing 310. The light emitting device 306 may provide information about the state of the electronic device in the form of light. The light emitting device 306 may provide a light source that interacts with the camera module 305. The light emitting device 306 may include an LED, an IR LED, or a xenon lamp.

The connector holes 308 and 309 may include a first connector hole 308 for receiving a connector (e.g., a USB connector) for transmitting or receiving power and/or data to/from an external electronic device and/or a second connector hole 309 (e.g., an earphone jack) for receiving a connector for transmitting or receiving audio signals to/from the external electronic device.

Figure 4:
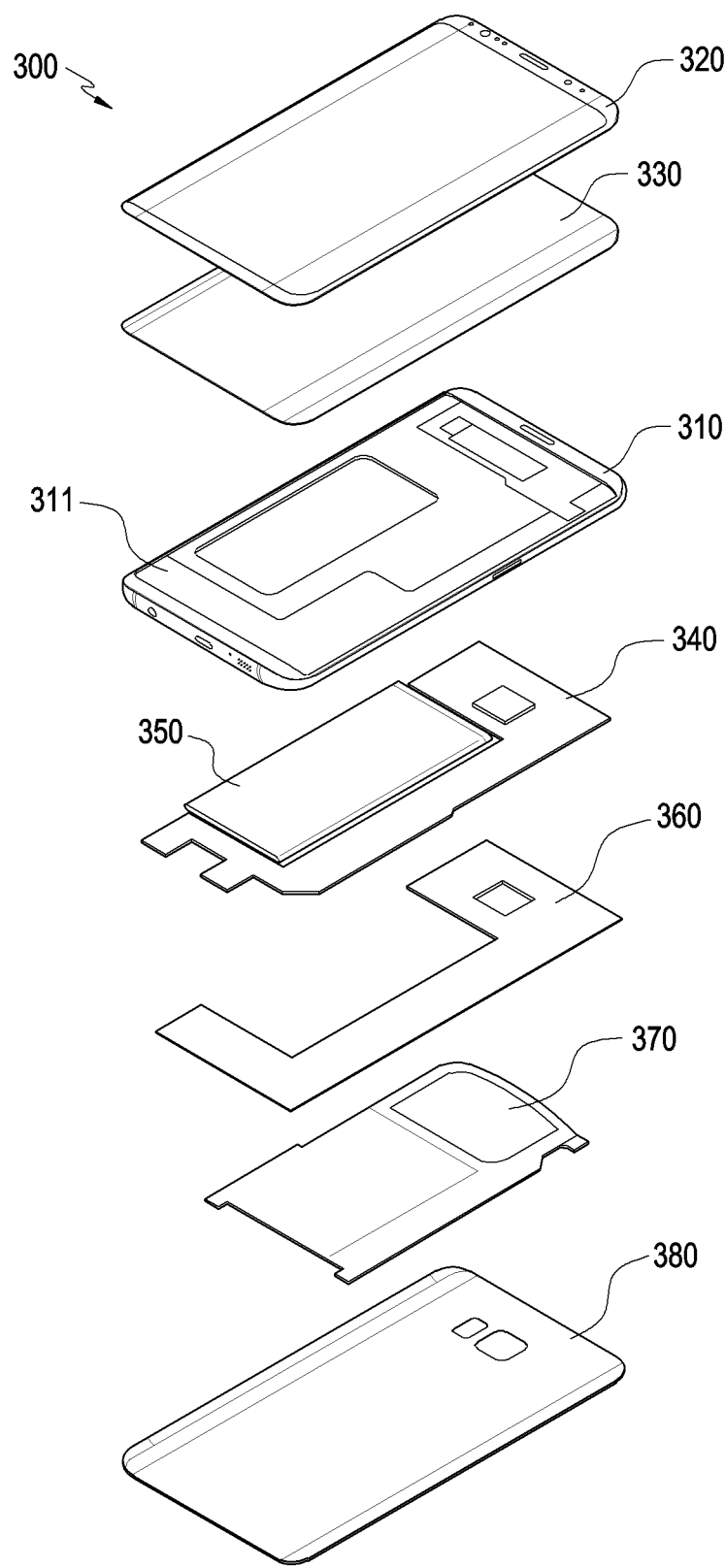
FIG. 4 illustrates an exploded view of an electronic device according to an embodiment.

FIG. 4 illustrates an exploded view of an electronic device according to an embodiment.

Referring to FIG. 4, an electronic device 300 (e.g., the electronic device 101 of FIGS. 1 to 3) may include a side bezel structure 331, a first supporting member 332 (e.g., a bracket), a front plate 320, a display 330, a PCB 340, a battery 350, a second supporting member 360 (e.g., a rear case), an antenna 370, and a rear plate 380. Alternatively, the electronic device may exclude at least one of the components (e.g., the first supporting member 332 or second supporting member 360) and/or may add other components.

The first supporting member 332 may be disposed inside the electronic device to be connected with the side bezel structure 331 or integrated with the side bezel structure 331. The first supporting member 332 may be formed of, e.g., a metal and/or non-metallic material (e.g., polymer). The display 330 may be joined onto one surface of the first supporting member 332, and the PCB 340 may be joined onto the opposite surface of the first supporting member 311. A processor, memory, and/or interface may be mounted on the PCB 340. The processor may include one or more of, e.g., a CPU, an AP, a GPU, an ISP, a sensor hub processor, or a CP.

The memory may include volatile or non-volatile memory.

The interface may include an HDMI, a USB interface, an SD card interface, and/or an audio interface. The interface may electrically or physically connect, e.g., the electronic device with an external electronic device and may include a USB connector, an SD card/multimedia card (MMC) connector, or an audio connector.

The battery 350 may supply power to at least one component of the electronic device. The battery 350 may include a primary cell, which is not rechargeable, a secondary cell, which is rechargeable, and/or a fuel cell. At least a portion of the battery 350 may be disposed on substantially the same plane as the PCB 340. The battery 350 may be integrally or detachably disposed inside the electronic device.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with an external device or may wirelessly transmit or receive power necessary for charging. An antenna structure may be formed by a portion or combination of the side bezel structure 331 and/or the first supporting member 332.

The electronic device may include a plurality of communication devices 390. For example, some of the plurality of communication devices 390 may be implemented to transmit or receive radio waves with different characteristics (e.g., radio waves of frequency bands A and B) to implement multiple input multiple output (MIMO). As another example, some of the plurality of communication devices 390 may be configured to simultaneously transmit or receive radio waves with the same characteristic (e.g., radio waves of frequencies A1 and A2 in frequency band A) to implement diversity. As another example, some of the plurality of communication devices 390 may be configured to simultaneously transmit or receive radio waves with the same characteristic (e.g., radio waves of frequencies B1 and B2 in frequency band B) to implement diversity.

Alternatively, multiple communication devices may be included. For example, the electronic device may include four communication devices to implement both MIMO and diversity.

Given the transmission and reception characteristics of radio waves, when one communication device is disposed in a first position of the PCB 340, another communication device may be disposed in a second position, which is separated from the first position, of the PCB 340. As another example, a first communication device and a second communication device may be disposed considering the distance therebetween depending on diversity characteristics.

At least one communication device 390 may include a wireless communication circuit to process radio waves transmitted or received in an ultra-high frequency band (e.g., 6 GHz or more and 3000 Hz or less). The radiating conductor(s) of the at least one communication device 390 may be formed of a dipole-structure radiating conductor extending in one direction or a patch-type radiating conductor and a plurality of radiating conductors may be arrayed to form an antenna array. A chip (e.g., an integrated circuit (IC) chip) in which part of the wireless communication circuit is implemented may be disposed on the opposite surface of the surface on which the radiating conductors are disposed or on one side of the area where the radiating conductors are disposed and may be electrically connected with the radiating conductor(s) via lines which are formed of a printed circuit pattern.

Figure 5:
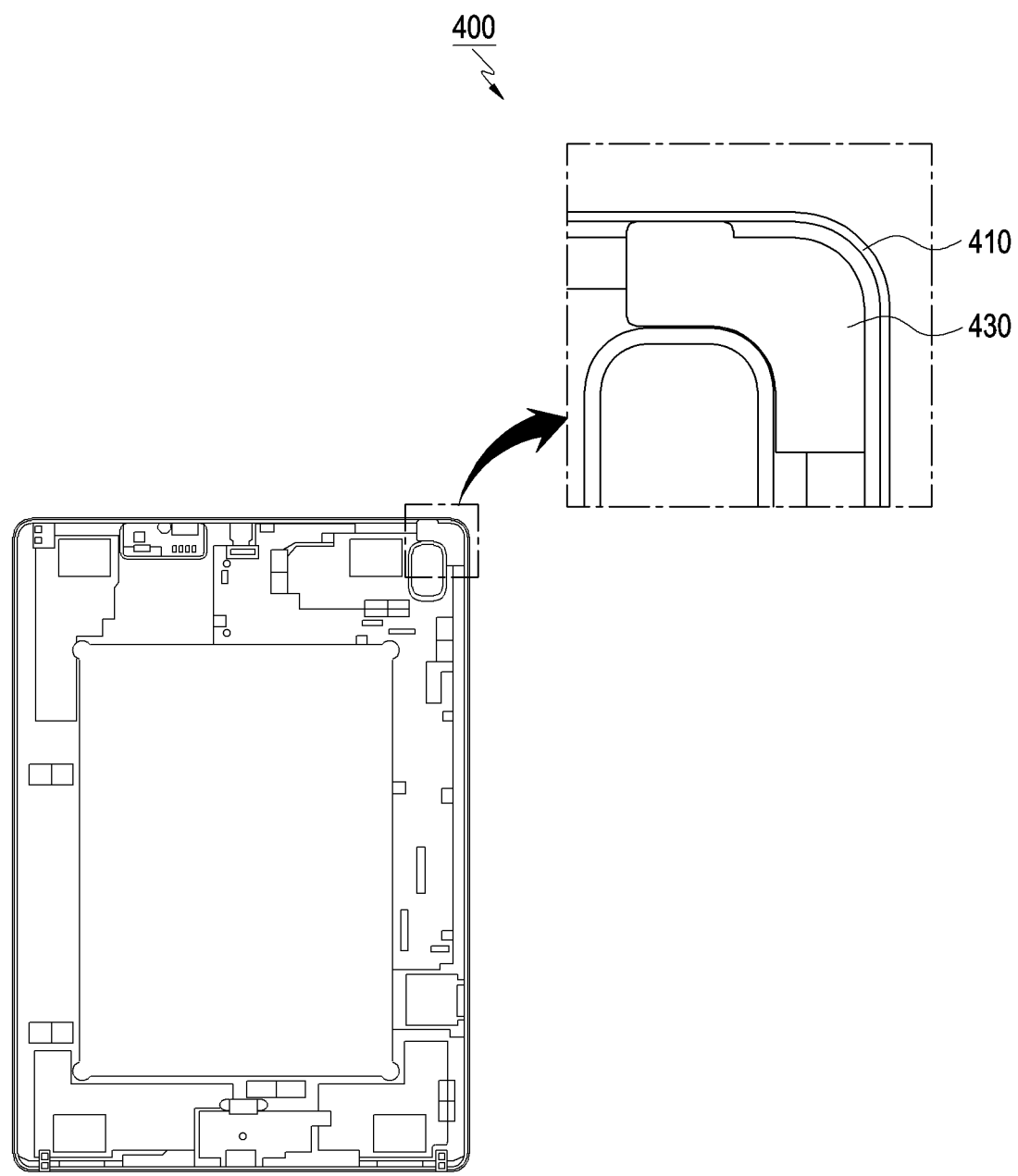
FIG. 5 illustrates an electronic device including an antenna according to an embodiment.
Figure 6:
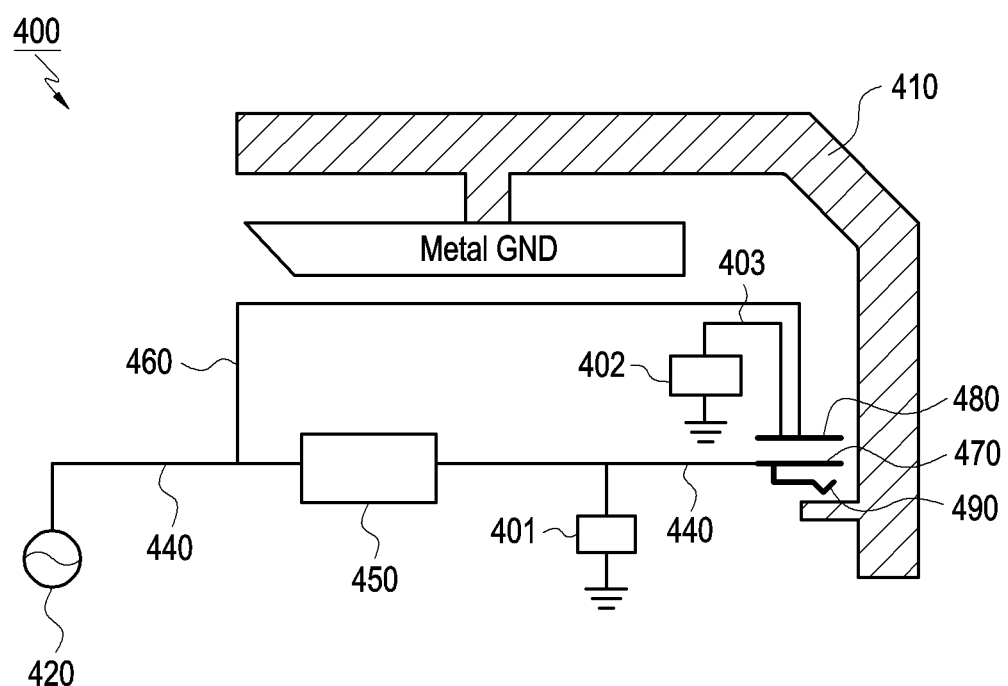
FIG. 6 illustrates an antenna included in an electronic device according to an embodiment.

FIG. 5 illustrates an electronic device according to an embodiment. FIG. 6 illustrates an antenna included in an electronic device according to an embodiment.

Referring to FIGS. 5 and 6, an electronic device may include a housing, a wireless communication circuit 420, a circuit board 430, first and second conductive paths 440 and 460, a capacitor 450, first and second conductive pads 470 and 480, and a conductive connection member 490. The housing may include a first plate (or front plate), a second plate (or rear plate) facing in a direction opposite to the first plate, and a side member surrounding a space between the first plate and the second plate and including a conductive member 410. The housing may also include a display exposed through at least a portion of the first plate.

The conductive member 410 may include at least one of a metal frame radiator, a loop radiator, a monopole radiator, a laser direct structuring (LDS) radiator, or a pattern radiator.

The conductive member 410 may be included in at least a portion of the housing. The conductive member 410 may form at least a portion of a side member of the housing. The conductive member 410 may include at least a portion of a metal frame (e.g., a metal frame radiator). The conductive member 410 may be a portion of a metal frame (e.g., a metal frame radiator) positioned at an upper left end of the electronic device. The conductive member 410 may be configured to resonate in a first frequency band (e.g., Wi-Fi 2.4 GHz) or a second frequency band (e.g., Wi-Fi 5 GHz or more), which is higher than the first frequency band. The conductive member 410 may have an electrical length that resonates in the first frequency band or the second frequency band. The conductive member 410 may operate as a radiator of the antenna 400. The conductive member 410 may resonate, in the first and second frequency bands, in the electrical length of the antenna 400. The conductive member 410 may transmit and/or receive signals of the first and second frequency bands.

The first frequency band may correspond to a low-band (e.g., about 600 MHz to 990 MHz) and/or a mid-band (e.g., about 1.4 GHz to 2.2 GHz) as defined by the $3^{rd}$ generation partnership project (3GPP), and the second frequency band may correspond to a high-band (e.g., about 2.2 GHz to 6 GHz). However, the first frequency band and the second frequency band may be different from those defined by the 3GPP. For example, the first frequency band may include one or more of a low-band, a mid-band, and a global positioning system (GPS) frequency band (e.g., 1.57 GHz). The second frequency band may include one or more service bands of a high-band, LAA (e.g., 5 GHz or more) or LTE-U (e.g., 5 GHz or more).

The wireless communication circuit 420 may be disposed in a space of the housing, and may feed power to the conductive member 410.

The circuit board 430 may be disposed in a space of the housing, and may include the first and second conductive paths 440 and 460, the first conductive pad 470, and/or the second conductive pad 480.

The first conductive path 440 may be disposed on at least a portion of the circuit board 430 to be electrically connected to the wireless communication circuit 420.

The capacitor 450 may be disposed on the first conductive path 440 and may electrically connect the wireless communication circuit 420 and the conductive member 410. The capacitor 450 may be a lumped element. The capacitor 450 may adjust the resonance frequency of the conductive member 410.

The second conductive path 460 may be disposed on at least a portion of the circuit board 430 and may be electrically connected with the first conductive path 440 between the wireless communication circuitry 420 and the capacitor 450. The second conductive path 460 may branch from the first conductive path 440 between the wireless communication circuit 420 and the capacitor 450. One end of the second conductive path 460 may be electrically connected to the first conductive path 440 between the wireless communication circuit 420 and the capacitor 450, and another end of the second conductive path 460 may be electrically connected to the second conductive pad 480.

The first conductive pad 470 may be disposed under at least a partial area of the circuit board 430 and may be electrically connected to the first conductive path 440. The first conductive pad 470 may be electrically connected to the conductive member 410 through the conductive connection member 490.

The second conductive pad 480 may be disposed on at least a partial area of the circuit board 430. The second conductive pad 480 may be electrically connected to the second conductive path 460. The second conductive pad 480 may be disposed to be spaced in parallel apart from the first conductive pad 470. The second conductive pad 480 may be coupled with the first conductive pad 470. The first conductive pad 470 and the second conductive pad 480 may be electrically coupled with each other, with a dielectric included in the circuit board 430 interposed therebetween. The first and second conductive pads 470 and 480 may operate as capacitive elements. Since the first and second conductive pads 470 and 480 are electrically coupled, the first and second conductive pads 470 and 480 may electrically connect the conductive member 410 and the wireless communication circuit 420 through the second conductive path 460 and allow the conductive member 410 to resonate in the second frequency band (e.g., Wi-Fi 5 GHz or higher).

The conductive connection member 490 may be disposed between the conductive member 410 and the first conductive pad 470. The conductive connection member 490 may be formed of a conductive material. The conductive connection member 490 may be electrically connected to the first conductive path 440, the first conductive pad 470, and the conductive member 410. The conductive connection member 490 may include at least one of a C-clip, a flexible conductive member 410, a pogo pin, a screw, or a spring, but is not limited thereto. For example, the conductive connection member 490 may be applied in various manners as long as it electrically connects the first conductive path 440, the first conductive pad 470, and the conductive member 410.

A first impedance circuit unit 401 may be electrically connected to the first conductive path 440 between the capacitor 450 and the first conductive pad 470. The first impedance circuit unit 401 may include a capacitor and/or an inductor. The first impedance circuit unit 401 may include a transmission line having capacitance and inductance. The first impedance circuit unit 401 may be electrically connected to the conductive member 410 through the conductive connection member 490. The first impedance circuit unit 401 may be electrically connected to a ground. The first impedance circuit unit 401 may match impedance so that the conductive member 410 may operate in the first frequency band or the second frequency band. The first impedance circuit unit 401 may tune the conductive member 410 in the first frequency band or the second frequency band.

When the conductive member 410 is tuned for resonance in the first frequency band (e.g., Wi-Fi 2.4 GHz), the effect of tuning the conductive member 410 on resonance in the second frequency band may be reduced. Accordingly, the wireless communication circuit 420 may be electrically connected to the conductive member 410 through the first impedance circuit unit 401, and the wireless communication circuit 420 may transmit and/or receive the signal of the first frequency band using the conductive member 410.

The third conductive path 403 may be electrically connected to the second conductive pad 480.

A second impedance circuit unit 402 may be disposed on the third conductive path 403. The second impedance circuit unit 402 may be electrically connected to the ground and may include a capacitor or an inductor. The second impedance circuit unit 402 may tune the conductive member 410 in the second frequency band. When the conductive member 410 is timed for resonance in the second frequency band, the effect of tuning the conductive member 410 on resonance in the first frequency band may be reduced. Accordingly, the wireless communication circuit 420 may be electrically connected to the conductive member 410 through the second impedance circuit unit 402, and the wireless communication circuit 420 may transmit and/or receive the signal of the second frequency band using the conductive member 410.

As the second conductive path 460 connected with the first conductive path 440 between the wireless communication circuitry 420 and the capacitor 450 is included in at least a portion of the circuit board 430, the second conductive path 460 may supply the current of the wireless communication circuit 420 to the second conductive pad 480 without passing through the capacitor 450, allowing for stable operation in the second frequency band (e.g., Wi-Fi 5 GHz or higher).

The wireless communication circuit 420 may supply a stable current to the first conductive path 440, allowing for stable resonance even in the first frequency band (e.g., Wi-Fi 2.4 GHz) of the conductive member 410 and enhancing efficiency and performance in the first frequency band. Further, as current is stably supplied to the second conductive pad 480, it is possible to facilitate coupling of the first and second conductive pads 470 and 480, thus allowing for easier resonance in the second band (e.g., Wi-Fi 5 GHz or higher) of the first and second conductive pads 470 and 480.

A conductive pattern may be disposed on at least a portion of the circuit board 430. For example, the conductive pattern may serve as at least one of the first and second conductive pads 470 and 480 and/or the conductive connection member 490. The conductive pattern may facilitate resonance of the antenna 400 and also enhance the efficiency of the antenna.

Figure 7:
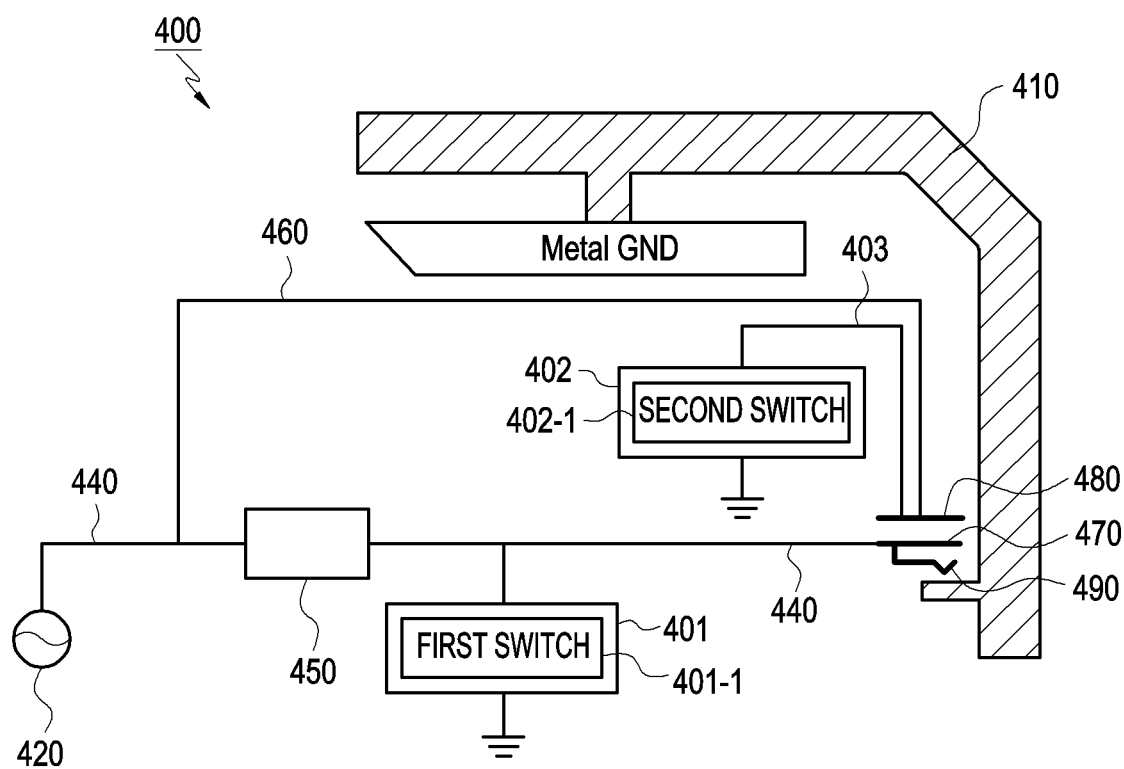
FIG. 7 illustrates an antenna included in an electronic device according to are embodiment.

FIG. 7 illustrates an antenna included in an electronic device according to an embodiment.

Referring to FIG. 7, an electronic device includes a housing, a wireless communication circuit 420, a circuit board 430, a first and second conductive path 440 and 460, a capacitor 450, first and second conductive pads 470 and 480, a conductive connection member 490, and first and second impedance circuit units 401 and 402.

The first impedance circuit unit 401 includes a first switch 401-1 to switch between a plurality of frequency bands, forming a variable impedance circuit unit. The first impedance circuit unit 401 may also include a capacitor and/or an inductor.

The plurality of frequency bands may include a low-band (e.g., about 600 MHz to 990 MHz) defined by the 3GPP, a Wi-Fi frequency band (e.g., 2.4 GHz), a mid-band (e.g., about 1.4 GHz to 2.2 GHz), a high-band (e.g., about 2.2 GHz to 6 GHz) and/or a Wi-Fi frequency band (e.g., 5 GHz or higher), but are not limited thereto. For example, the plurality of frequency bands may include one or more service bands among a low-band, a mid-band, a GPS frequency band (e.g., 1.57 GHz), a high-band, LAA (e.g., 5 GHz or more) or LTE-U (e.g., 5 GHz or more).

The operation of the first impedance circuit unit 401 may be controlled by a processor. For example, the processor may control the first impedance circuit unit 401 so that the conductive member 410 may implement resonance in the plurality of frequency bands.

The second impedance circuit unit 402 includes a second switch 402-1 to switch between a plurality of frequency bands, forming a variable impedance circuit unit. The second impedance circuit unit 402 may also include a capacitor and/or an inductor.

As the first impedance circuit unit 401 or the second impedance circuit unit 402 switches to the frequency band suitable for use of the antenna 400, the antenna 400 may resonate in the selected frequency band, thereby stably transmitting and/or receiving signals. Thus, the first impedance circuit unit 401 or the second impedance circuit unit 402 may enhance the radiation performance of the antenna 400 as well as the efficiency and use of the antenna 400.

Figure 8:
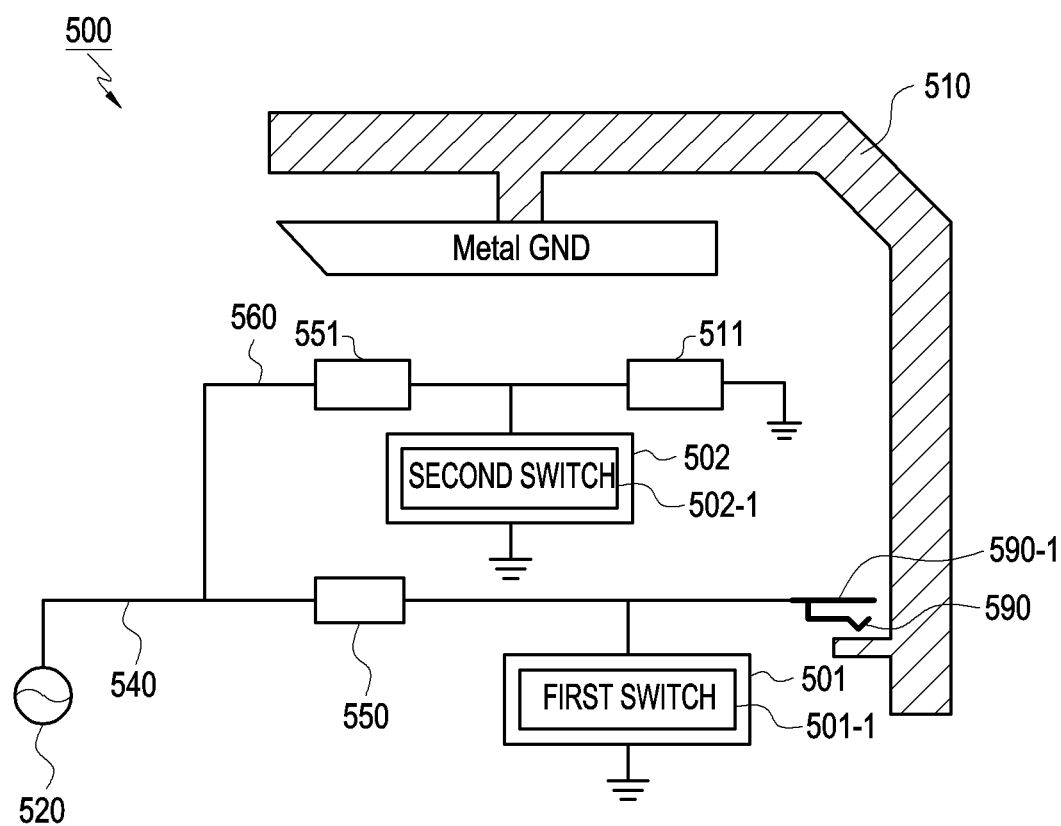
FIG. 8 illustrates an antenna included in an electronic device according to an embodiment.

FIG. 8 illustrates an antenna included in an electronic device according to an embodiment.

Referring to FIG. 8, an electronic device includes a housing, a wireless communication circuit 520, a circuit board, first and second conductive paths 540 and 560, first and second capacitors 550 and 551, first and second conductive members 510 and 511, and a conductive connection member 590.

The housing may include the first conductive member 510, which may include at least one of a metal frame radiator, a roof radiator, a monopole radiator, or an LDS radiator. The housing may include the second conductive member 511. The second conductive member 511 may include at least one of an LDS radiator, a pattern radiator, or a loop radiator. For example, the first conductive member 510 may be formed of a metal frame radiator, and the second conductive member 511 may be formed of an LDS radiator or a conductive pattern formed on a PCB.

The first capacitor 550 may be disposed on the first conductive path 540. The first capacitor 550 may include at least one of a low capacitor (e.g., 3 pF or less) or a high capacitor (e.g., 30 pF or more). For example, the first capacitor 550 may be formed of a high capacitor (e.g., 30 pF or more).

The second conductive path 560 may be disposed on at least a portion of the circuit board. The second conductive path 560 may be electrically connected to the first conductive path 540 between the wireless communication circuit 520 and the first capacitor 550.

The second capacitor 551 may be disposed on the second conductive path 560. The second capacitor 551 may include at least one of a low capacitor (e.g., 3 pF or less) or a high capacitor (e.g., 30 pF or more). For example, the second capacitor 551 may be formed of a low capacitor (e.g., 30 pF or more).

The first capacitor 550 may be formed of the high capacitor (e.g., 30 pF or more), and the second capacitor 551 may be formed of a low capacitor (e.g., 3 pF or less). Further, if the first capacitor 550 is formed of a low capacitor (e.g., 3 pF or less), the second capacitor 551 may be formed of the high capacitor (e.g., 30 pF or more).

One end of the second conductive member 511 may be electrically connected to the second conductive path 560. Another end of the second conductive member 511 may be connected to the ground. As another example, the other end of the second conductive member 511 may not be connected to the ground.

The conductive connection member 590 may be electrically connected to the first conductive path 540. For example, the conductive connection member 590 may electrically connect the first conductive member 510 and a first conductive pad 590-1 electrically connected to the first conductive path 540.

The first conductive member 510 may resonate in a first frequency band (e.g., Wi-Fi 2.4 GHz) or in a second frequency band (e.g., Wi-Fi 5 GHz or higher) that is higher than the first frequency band. The second conductive member 511 may resonate in the second frequency band or the first frequency band. For example, the second conductive member 511 may resonate in a frequency band different from that of the first conductive member 510.

The first conductive member 510 may form at least a portion of a side member of the housing. For example, the first conductive member 510 may be included in at least a portion of the metal frame. At least a portion of the metal frame may operate as a radiator of the antenna. The first conductive member 510 may have an electrical length to resonate in a first frequency band (e.g., Wi-Fi 2.4 GHz) or a second frequency band (e.g., Wi-Fi 5 GHz or higher) that is higher than the first frequency band. The first conductive member 510 may operate as a radiator of the antenna 500. The first conductive member 510 may transmit and/or receive signals of the first and second frequency bands.

The second conductive member 511 may be electrically connected to the second conductive path 560 and may be configured to resonate in the second frequency band (e.g., Wi-Fi 5 GHz or higher) higher than the first frequency band (e.g., Wi-Fi 2.4 GHz). The second conductive member 511 may have an electrical length capable of resonating in the second frequency band. The second conductive member 511 may operate as a radiator of the antenna 500. The second conductive member 511 may transmit and/or receive signals of the second frequency band.

The first impedance circuit unit 501 may be electrically connected to the first conductive path 540 between the first capacitor 550 and the conductive connection member 590. The first impedance circuit unit 501 may be electrically connected to the first conductive member 510 and the conductive connection member 590.

The second impedance circuit unit 502 may be electrically connected to the second conductive path 560 between the second capacitor 551 and the second conductive member 511.

The first impedance circuit unit 501 or the second impedance circuit unit 502 may be electrically connected to a ground. The first impedance circuit unit 501 includes a first switch 501-1 to form a variable impedance circuit unit. The first impedance circuit unit 501 may also include a capacitor and/or an inductor.

The second impedance circuit unit 502 may include at least one of a capacitor, an inductor, and/or the second switch 502-1 to form a variable impedance circuit unit. The second impedance circuit unit 502 may also include a capacitor and/or an inductor.

The first and second impedance circuit units 501 and 502 may switch fixed reactance values according to a frequency band selected from among a plurality of frequency bands.

Figure 9:
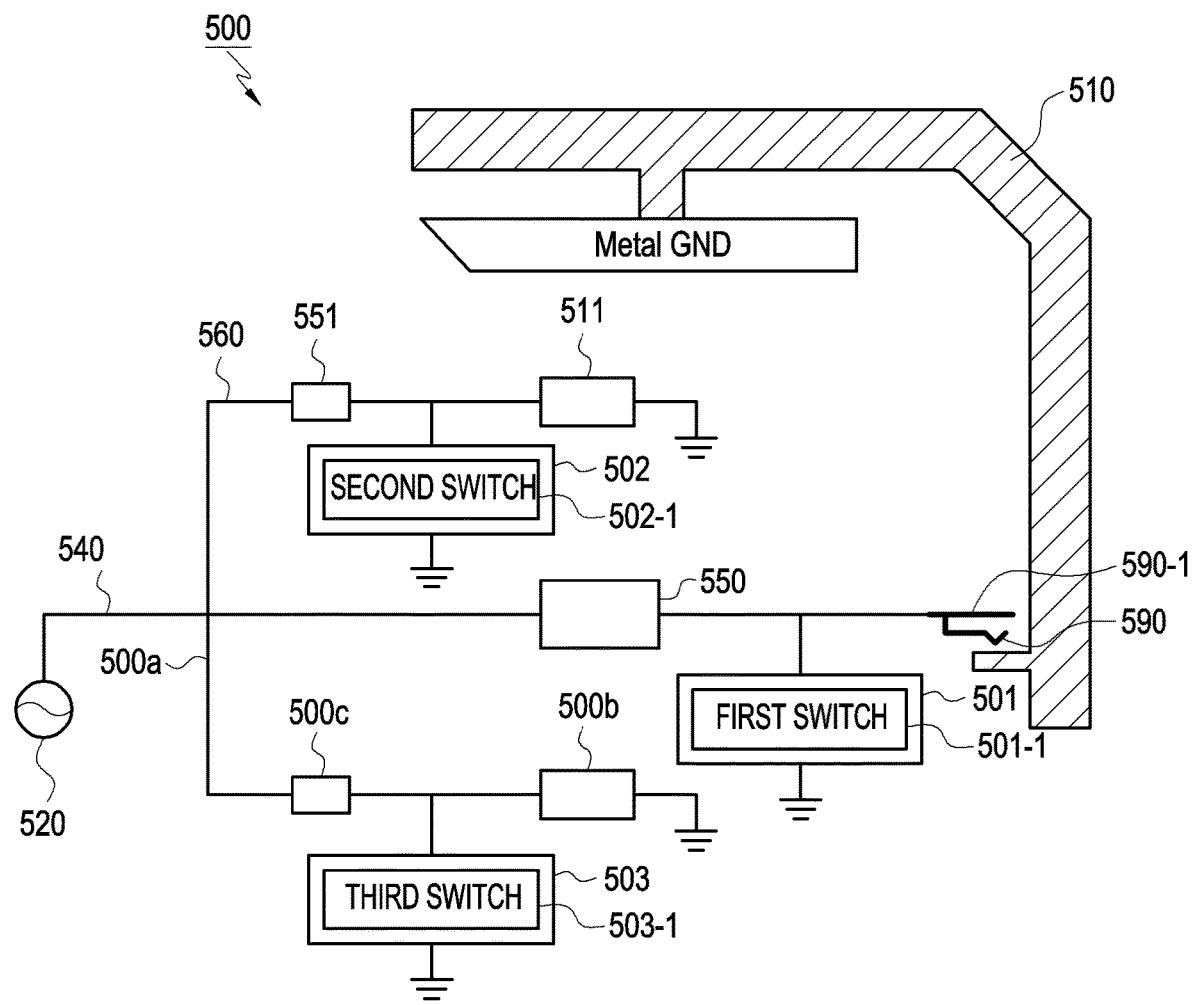
FIG. 9 illustrates an antenna included in an electronic device according to an embodiment.

FIG. 9 illustrates an antenna included in an electronic device according to an embodiment.

Referring to FIG. 9, the electronic device includes a housing, a wireless communication circuit 520, a circuit board, first, second, and third conductive paths 540, 560, and 500a, first, second, and third capacitors 550, 551, and 500c, first, second, and third conductive members 510, 511, and 500b, and/or a conductive connection member 590.

The first conductive member 510 may include at least one of a metal frame radiator, a roof radiator, a monopole radiator, or an LDS radiator. The second and third conductive members 511 and 500b may include an LDS pattern radiator or a loop radiator. For example, the first conductive member 510 may be formed of a metal frame radiator, and the second and third conductive members 511 and 500b may be formed of an LDS radiator or a conductive pattern formed on a PCB.

The first capacitor 550 may be disposed on the first conductive path 540. The first capacitor 550 may include at least one of a low capacitor (e.g., 3 pF or less) or a high capacitor (e.g., 30 pF or more). For example, the first capacitor 550 may be formed of a low capacitor (e.g., 3 pF or less).

The second conductive path 560 may be disposed on at least a portion of the circuit board. The second conductive path 560 may be electrically connected to the first conductive path 540 between the wireless communication circuit 520 and the first capacitor 550.

The second capacitor 502 may be disposed on the second conductive path 560. The second capacitor 551 may include at least one of a low capacitor (e.g., 3 pF or less) or a high capacitor (e.g., 30 pF or more). For example, the second capacitor may be formed of a high capacitor (e.g., 30 pF or more).

The second conductive member 511 may be electrically connected to the second conductive path 560. The second conductive member 511 may be connected to the ground. As another example, the second conductive member 511 may not be connected to the ground.

The third conductive path 500a may be included in at least a portion of the circuit board. The third conductive path 500a may be electrically connected to the first conductive path 540 between the wireless communication circuit 520 and the first capacitor 550.

The third capacitor 500c may be disposed on the third conductive path 500a. The third capacitor 500c may include at least one of a low capacitor (e.g., 3 pF or less) or a high capacitor (e.g., 30 pF or more). For example, the third capacitor 500c may be formed of a high capacitor (e.g., 30 pF or more).

The first capacitor 550 may be formed of the low capacitor (e.g., 3 pF or less), and the second and third capacitors be formed of high capacitors (e.g., 30 pF or more).

The third conductive member 500b may be electrically connected to the third conductive path 500a. The third conductive member 500b may be connected to the ground. As another example, the third conductive member 500b may not be connected to the ground.

The conductive connection member 590 may be electrically connected to the first conductive path 540 and may electrically connect the first conductive member 510 and the first conductive pad 5904 electrically connected to the first conductive path 540.

The first conductive member 510 may resonate in a first frequency band (e.g., Wi-Fi 2.4 GHz) or in a second frequency band (e.g., Wi-Fi 5 GHz or higher) that is higher than the first frequency band. The second conductive member 511 or the third conductive member 500b may resonate in the first frequency band, the second frequency band, or a frequency band other than the second frequency band. For example, the first conductive member 510, the second conductive member 511, or the third conductive member 500b may resonate in different frequency bands.

The first conductive member 510 may form at least a portion of a side member of the housing. The first conductive member 510 may be included in at least a portion of the metal frame. At least a portion of the metal frame may operate as a radiator of the antenna. For example, the first conductive member 510 may have an electrical length to resonate in a first frequency band (e.g., Wi-Fi 2.4 GHz) or a second frequency band (e.g., Wi-Fi 5 GHz or higher) that is higher than the first frequency band. The first conductive member 510 may operate as a radiator of the antenna 500. The first conductive member 510 may transmit and/or receive signals of the first and second frequency bands.

The second conductive member 511 may be electrically connected to the second conductive path 560. The third conductive member 500b may be electrically connected to the third conductive path 500a. The second and third conductive members 511 and 500b may have an electrical length capable of resonating in the second frequency band. The second and third conductive members 511 and 500b may operate as radiators of the antenna 500. The second and third conductive members 511 and 500b may transmit and/or receive signals of the second frequency band. For example, the second conductive member 511 or the third conductive member 500b may transmit and/or receive signals of other frequency bands as well as the signals of the second frequency band.

The first impedance circuit unit 501 may be electrically connected to the first conductive path 540 between the first capacitor 550 and the conductive connection member 590. The first impedance circuit unit 501 may be electrically connected to a around.

The second impedance circuit unit 502 may be disposed on the second conductive path 560. The second impedance circuit unit 502 may be electrically connected to the second conductive path 560 between the second capacitor 502 and the second conductive member 511, and the second impedance circuit unit 502 may be electrically connected to the second conductive member 511. The second impedance circuit unit 502 may be electrically connected to the ground.

A third impedance circuit unit 503 may be disposed on the third conductive path 500a. The third impedance circuit unit 503 may be electrically connected to the third conductive path 500a between the third capacitor 500c and the second conductive member 500b. The third impedance circuit unit 503 may be electrically connected to the third conductive member 500b. The third impedance circuit unit 503 may be electrically connected to the ground.

The first, second, and third impedance circuit units 501, 502, and 503 include first, second, and third switches 5014, 502-1, and 503-1 to switch between a plurality of frequency bands. The first, second, and third impedance circuit units 501, 502, and 503 may also include capacitors and/or inductors. The first, second, and third impedance circuit units 501, 502, and 503 may switch fixed reactance values according to a frequency band selected from among a plurality of frequency bands.

Figure 10:
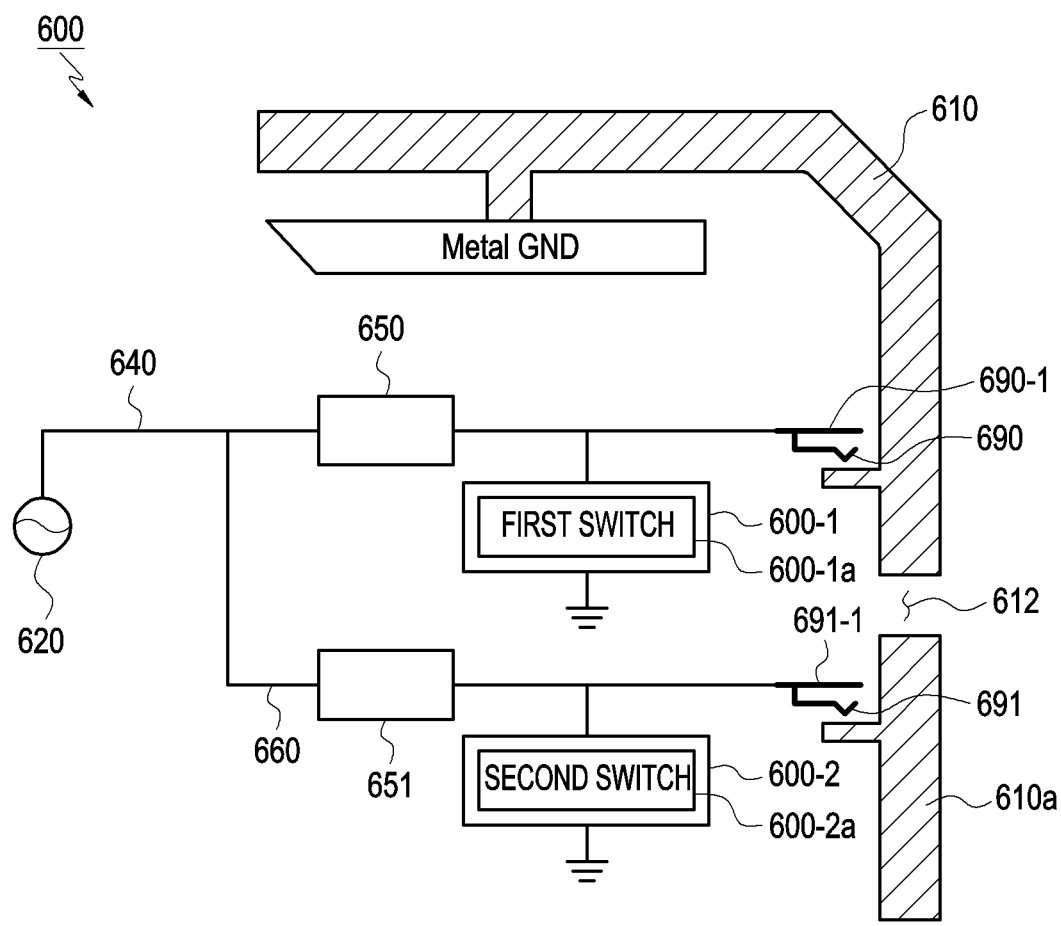
FIG. 10 illustrates an antenna included in an electronic device according to an embodiment.

FIG. 10 illustrates an antenna included in an electronic device according to an embodiment.

Referring to FIG. 10, the electronic device includes a housing, a wireless communication circuit 620, a circuit board, first and second conductive paths 640 and 660, first and second capacitors 650 and 651, first and second conductive members 610 and 610a, first and second conductive connection members 690 and 691, and first and second impedance circuit units 600-1 and 600-2.

The housing may include the first and second conductive members 610 and 610a. The first and second conductive members 610 and 610a may include at least one of a metal frame radiator, a loop radiator, a monopole radiator, a pattern radiator, and an LDS radiator. For example, the first conductive member 610 or the second conductive member 610a may be formed of a metal frame radiator.

The first capacitor 650 may be disposed on the first conductive path 640. The first capacitor 650 may include at least one of a low capacitor (e.g., 3 pF or less) or a high capacitor (e.g., 30 pF or more). For example, the first capacitor 650 may be formed of a low capacitor (e.g., 3 pF or less).

The second conductive path 660 may be disposed on at least a portion of the circuit board. The second conductive path 660 may be electrically connected to the first conductive path 640 between the wireless communication circuit 620 and the first capacitor 650.

The second capacitor 651 may be disposed on the second conductive path 660. The second capacitor 651 may include at least one of a low capacitor (e.g., 3 pF or less) or a high capacitor (e.g., 30 pF or more). For example, the second capacitor 651 may be formed of a low capacitor (e.g., 3 pF or less).

The first and second capacitors 650 and 651 may be formed of low capacitors. As another example, if the first capacitor 650 is formed of a low capacitor, the second capacitor 651 may be formed of a high capacitor. As another example, if the first capacitor 650 is formed of a high capacitor, the second capacitor 651 may be formed of a low capacitor.

The second conductive member 610a may be electrically connected to the second conductive path 660.

The first conductive connection member 690 may be electrically connected to the first conductive path 640 and may electrically connect the first conductive member 610 and the first conductive pad 690-1.

The second conductive connection member 691 may be electrically connected to the second conductive path 660 and may electrically connect the second conductive member 610a and the second conductive pad 691-1.

The first conductive member 610 or the second conductive member 610a may resonate in a first frequency band (e.g., Wi-Fi 2.4 GHz) or a second frequency band (e.g., Wi-Fi 5 GHz or higher) that is higher than the first frequency band.

The first conductive member 610 or the second conductive member 610a may forma at least a portion of a side member of the housing. The first conductive member 610 or the second conductive member 610a may be configured to resonate in the first frequency band (e.g., Wi-Fi 2.4 GHz) or the second frequency band (e.g., Wi-Fi 5 GHz or higher) that is higher than the first frequency band. For example, the first conductive member 610 or the second conductive member 610a may have an electrical length that resonates in the first frequency band or the second frequency band. The first conductive member 610 or the second conductive member 610a may operate as a radiator of the antenna 600. The first conductive member 610 or the second conductive member 610a may transmit and/or receive signals of the first and second frequency bands.

A segmenting portion 612 may be included between the first conductive member 610 or the second conductive member 610a.

The first impedance circuit unit 600-1 may be disposed on the first conductive path 640. The first impedance circuit unit 600-1 includes a first switch 600-1a to switch between a plurality of frequency bands, forming a variable impedance circuit unit. The first impedance circuit unit 600-1 may also include a capacitor and/or an inductor. The first impedance circuit unit 600-1 may be electrically connected to the first conductive path 640 between the first capacitor 650 and the first conductive connection member 690 and may be electrically connected to ground.

The operation of the first impedance circuit unit 600-1 may be controlled by a processor. For example, the processor may control the first impedance circuit unit 600-1 so that the first conductive member 610 may implement resonance in the plurality of frequency bands.

The first impedance circuit unit 600-1 may switch fixed reactance values according to a frequency band selected from among a plurality of frequency bands. The plurality of frequency bands may include at least one of a low-band (e.g., about 600 MHz to 990 MHz) defined by the 3GPP, a Wi-Fi frequency band (e.g., Wi-Fi 2.4 GHz), a mid-band (e.g., about 1.4 GHz to 2.2 GHz), a high-band (e.g., about 2.2 GHz to 6 GHz) and/or a Wi-Fi frequency band (e.g., Wi-Fi 5 GHz or higher), but are not limited thereto. For example, the plurality of frequency bands may include one or more service bands among a low-band, a mid-band, a GPS frequency band (e.g., 1.57 GHz), a high-band, LAA (e.g., 5 GHz or more) or LTE-U (e.g., 5 GHz or more).

The second impedance circuit unit 600-2 may be disposed on the second conductive path 660. The second impedance circuit unit 600-2 includes a second switch 600-2a to switch between a plurality of frequency bands, forming a variable impedance circuit unit. The second impedance circuit unit 600-2 may also include a capacitor and/or an inductor. The second impedance circuit unit 600-2 may be electrically connected to the second conductive path 660 between the second capacitor 651 and the second conductive connection member 691 and may be electrically connected to ground.

The operation of the first impedance circuit unit 600-2 may be controlled by a processor. For example, the processor may control the second impedance circuit unit 600-2 so that the second conductive member 610a may implement resonance in the plurality of frequency bands.

The second impedance circuit unit 600-2 may switch fixed reactance values according to a frequency band selected from among the plurality of frequency bands.

As the second conductive path 660 electrically connected to the first conductive path 640 between the wireless communication circuit 620 and the first capacitor 650 is configured, the second conductive member 610a may stably receive a current, forming stable resonance in the second frequency band (e.g., Wi-Fi 5 GHz or higher).

As another example, as the wireless communication circuit 620 supplies a stable current to the first conductive path 640, the first conductive member 610 may also form stable resonance in the first frequency band (e.g., Wi-Fi 2.4 GHz).

The first impedance circuit unit 600-1 or the second impedance circuit unit 600-2 may switch to a frequency band suitable for use of the antenna 600, allowing the antenna 600 to resonate in the selected frequency band.

Figure 11:
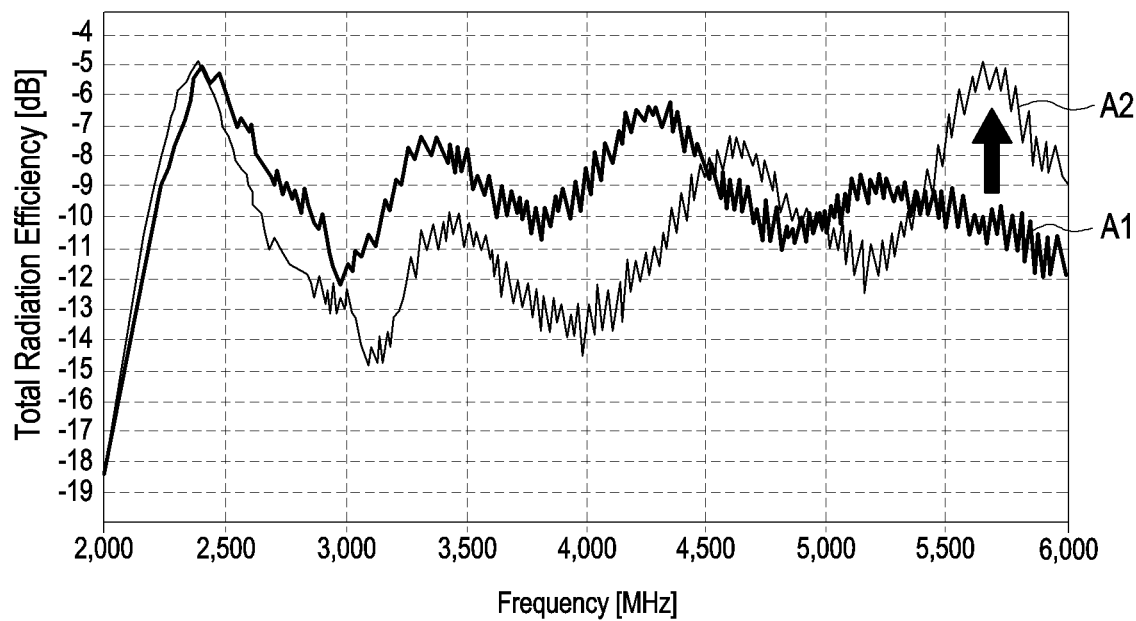
FIG. 11 is a graph illustrating radiation efficiency according to a frequency of an antenna included in an electronic device according to an embodiment.

FIG. 11 is a graph illustrating a radiation efficiency according to a frequency of an antenna included in an electronic device according to an embodiment.

Referring to FIG. 11, an antenna included in an electronic device may exhibit a radiation efficiency A2 in the 2.0 GHz-6.0 GHz band.

As shown in FIG. 11 in the band of 5.5 GHz to 6.0 GHz, the radiation efficiency A2 of an antenna according to an embodiment of the disclosure is shown as high compared with a radiation efficiency A1 of a conventional antenna.

Accordingly, an antenna according to an embodiment of the disclosure (e.g., antennas 400, 500, and 600 of FIGS. 6, 8, and 10) may have excellent antenna performance in the 5.5 GHz-6.0 GHz band.

According to an embodiment, an electronic device may include a housing including a first plate, a second plate facing in a direction opposite to the first plate, and a side member surrounding a space between the first plate and the second plate and including a conductive member 410, a wireless communication circuit disposed in the space, a circuit board disposed in the space, a first conductive path disposed on at least a portion of the circuit board and electrically connected with the wireless communication circuit, a capacitor disposed on the first conductive path, a second conductive path disposed on at least a portion of the circuit board and electrically connected with the first conductive path between the wireless communication circuit and the capacitor, a first conductive pad electrically connected with the first conductive path, a second conductive pad electrically connected with the second conductive path and disposed to be coupled with the first conductive pad, and a conductive connection member electrically connecting the first conductive pad and the conductive member. The conductive member may be configured to resonate in a first frequency band or a second frequency band higher than the first frequency band.

The electronic device may further include a first impedance circuit unit electrically connected to the first conductive path between the capacitor and the first conductive pad, electrically connected to a ground, and including a capacitor and/or an inductor.

The electronic device may further include a third conductive path electrically connected with the second conductive pad and the ground.

The electronic device may further include a second impedance circuit unit disposed on the third conductive path, electrically connected to the ground, and including a capacitor and/or an inductor.

The conductive member may include at least one of a metal frame radiator, a loop radiator, a monopole radiator, an LDS radiator, or a pattern radiator.

The conductive connection member may include at least one of a C-clip, a flexible conductive member, a pogo pin, a screw, or a spring.

The first frequency band may include a 2.4 GHz frequency band of Wi-Fi, and the second frequency band may include a 5.0 GHz frequency band of Wi-Fi.

The capacitor may include at least one of a low capacitor (e.g., 3 pF or less) or a high capacitor (e.g., 30 pF or more).

The first impedance circuit unit may further include a capacitor, an inductor, and/or a first switch to switch between a plurality of frequency bands, and the second impedance circuit unit may further include a capacitor, an inductor, and/or a second switch to switch between a plurality of frequency bands.

According to various embodiments of the disclosure, an electronic device (e.g., the electronic device 101 of FIGS. 1 to 3) may comprise a housing (e.g., the housing 310 of FIG. 2) including a first plate (e.g., the front plate 302 of FIG. 2), a second plate (e.g., the rear plate 311 of FIG. 3) facing in a direction opposite to the first plate, and a side member (e.g., the side member 318 of FIG. 2) surrounding a space between the first plate and the second plate and including a conductive member 410, a wireless communication circuit (e.g., the wireless communication circuit 420 of FIG. 6) disposed in the space, a circuit board (e.g., the circuit board 430 of FIG. 5) disposed in the space, a first conductive path (e.g., the first conductive path 440 of FIG. 6) disposed on at least a portion of the circuit board and electrically connected with the wireless communication circuit, a capacitor (e.g., the capacitor 450 of FIG. 6) disposed on the first conductive path, a second conductive path (e.g., the second conductive path 460 of FIG. 6) disposed on at least a portion of the circuit board and electrically connected with the first conductive path between the wireless communication circuit and the capacitor, a first conductive pad (e.g., the first conductive pad 470 of FIG. 6) electrically connected with the first conductive path, a second conductive pad (e.g., the second conductive pad 480 of FIG. 6) electrically connected with the second conductive path and disposed to be coupled with the first conductive pad, and a conductive connection member (e.g., the conductive connection member 490 of FIG. 6) electrically connecting the first conductive pad and the conductive member. The conductive member may be configured to resonate in a first frequency band or a second frequency band higher than the first frequency band.

According to various embodiments of the disclosure, the electronic device may further comprise a first impedance circuit unit (e.g., the first impedance circuit unit 401 of FIG. 6) electrically connected to the first conductive path between the capacitor and the first conductive pad, electrically connected to a ground, and including a capacitor and/or an inductor.

According to various embodiments of the disclosure, the electronic device may further comprise a third conductive path (e.g., the third conductive path 403 of FIG. 6) electrically connected with the second conductive pad and the ground.

According to various embodiments of the disclosure, the electronic device may further comprise a second impedance circuit unit (e.g., the second impedance circuit unit 402 of FIG. 6) disposed on the third conductive path, electrically connected to the ground, and including a capacitor and/or an inductor.

According to various embodiments of the disclosure, the conductive member may include at least one of a metal frame radiator, a loop radiator, a monopole radiator, an LDS radiator, or a pattern radiator.

According to various embodiments of the disclosure, the conductive connection member may include at least one of a C-clip, a flexible conductive member, a pogo pin, a screw, or a spring.

According to various embodiments of the disclosure, the first frequency band may include a 2.4 frequency band of Wi-Fi, and the second frequency band may include a 5.0 frequency band of Wi-Fi.

According to various embodiments of the disclosure, the capacitor may include at least one of a low capacitor (e.g., 3 pF or less) or a high capacitor (e.g., 30 pF or more).

According to various embodiments of the disclosure, the first impedance circuit unit may further include a capacitor, an inductor, and/or a first switch (e.g., the first switch 401-1 of FIG. 7) to switch between a plurality of frequency bands, and the second impedance circuit unit may further include a capacitor, an inductor, and/or a second switch (e.g., the second switch 402-1 of FIG. 7) to switch between a plurality of frequency bands.

According to various embodiments of the disclosure, an electronic device the electronic device 101 of FIGS. 1 to 3) may comprise a housing including a first plate facing in a first direction, a second plate facing in a second direction opposite to the first direction, and a side member surrounding a space between the first plate and the second plate and including a first conductive member, a wireless communication circuit (e.g., the wireless communication circuit 520 of FIG. 8) disposed in the space, a circuit board disposed in the space, a first conductive path (e.g., the first conductive path 540 of FIG. 8) disposed on at least a portion of the circuit board and electrically connected with the wireless communication circuit, a first capacitor (e.g., the first capacitor 550 of FIG. 8) disposed on the first conductive path, a second conductive path (e.g., the second conductive path 560 of FIG. 8) disposed on at least a portion of the circuit board and electrically connected with the first conductive path between the wireless communication circuit and the first capacitor, a second capacitor (e.g., the second capacitor 551 of FIG. 8) disposed on the second conductive path, a second conductive member (e.g., the second conductive member 511 of FIG. 8) electrically connected to the second conductive path, and a conductive connection member (e.g., the conductive connection member 590 of FIG. 8) electrically connecting the first conductive member and a first conductive pad electrically connected to the first conductive path. The first conductive member may be configured to resonate in a first frequency band, and the second conductive member may be configured to resonate in a second frequency band.

According to various embodiments of the disclosure, the first conductive member may be configured to resonate in the second frequency band, and the second conductive member may be configured to resonate in the first frequency band.

According to various embodiments of the disclosure, the first capacitor may be formed of either a low capacitor or a high capacitor, and the second capacitor may be formed of the other capacitor.

According to various embodiments of the disclosure, the electronic device may further comprise a first impedance circuit unit (e.g., the first impedance circuit unit 501 of FIG. 8) electrically connected to the first conductive path between the first capacitor and the conductive connection member, electrically connected to a ground, and including a capacitor, an inductor, and/or a first switch.

According to various embodiments of the disclosure, the electronic device may further comprise a second impedance circuit unit (e.g., the second impedance circuit unit 502 of FIG. 8) electrically connected to the second conductive path between the second capacitor and the second conductive member, electrically connected to the ground, and including a capacitor, an inductor, and/or a second switch.

According to various embodiments of the disclosure, the electronic device may further comprise a third conductive path the third conductive path 500a of FIG. 9) disposed on at least a portion of the circuit board and electrically connected with the first conductive path between the wireless communication circuit and the first capacitor and a third conductive member (e.g., the third conductive member 500b of FIG. 9) electrically connected to the third conductive path.

According to various embodiments of the disclosure, the electronic device may further comprise a third capacitor disposed on the third conductive path and a third impedance circuit unit (e.g., the third impedance circuit unit 503 of FIG. 9) electrically connected to the third conductive path between the third capacitor and the third conductive member, electrically connected to the ground, and including a capacitor, an inductor, and/or a third switch.

According to various embodiments of the disclosure, the first conductive member may include at least one of a metal frame radiator, a loop radiator, a monopole radiator, a patch antenna, or an LDS radiator, and the second and third conductive members may include at least one of an LDS radiator, a pattern radiator, or a loop radiator.

According to various embodiments of the disclosure, an electronic device may comprise a housing including a first plate facing in a first direction, a second plate facing in a second direction opposite to the first direction, and a side member surrounding a space between the first plate and the second plate and including a first and second conductive member (e.g., the first and second conductive members 610 and 610a of FIG. 10), a wireless communication circuit disposed in the space, a circuit board disposed in the space, a first conductive path disposed on at least a portion of the circuit board and electrically connected with the wireless communication circuit, a first capacitor disposed on the first conductive path, the first conductive member (e.g., the first conductive member 610 of FIG. 10) electrically connected to the first conductive path, a second conductive path disposed on at least a portion of the circuit board and electrically connected with the first conductive path between the wireless communication circuit and the first capacitor, a second capacitor disposed on the second conductive path, the second conductive member (e.g., the second conductive member 610a of FIG. 10) electrically connected to the second conductive path, a first conductive connection member (e.g., the first conductive connection member 690-1 of FIG. 10) electrically connecting the first conductive member and a first conductive pad electrically connected to the first conductive path, and a second conductive connection member (e.g., the second conductive connection member 691-1 of FIG. 10) electrically connecting the second conductive member and a second conductive pad electrically connected to the second conductive path. The first conductive member may be configured to resonate in a first frequency band or a second frequency band higher than the first frequency band, and the second conductive member may be configured to resonate in the second frequency band.

According to various embodiments of the disclosure, the first conductive member (e.g., the first conductive member 610 of FIG. 10) or the second conductive member (e.g., the second conductive member 611 of FIG. 10) may be formed of a metal frame radiator.

According to various embodiments of the disclosure, the electronic device may further comprise a first impedance circuit unit the first impedance circuit unit 600-1 of FIG. 10) electrically connected to the first conductive path between the first capacitor and the first conductive connection member, electrically connected to a ground, and including a capacitor, an inductor, and/or a first switch (e.g., the first switch 600-1a of FIG. 10) and a second impedance circuit unit (e.g., the second impedance circuit unit 600-2 of FIG. 10) electrically connected to the second conductive path between the second capacitor and the second conductive connection member, electrically connected to the ground, and including a capacitor, an inductor, and/or a second switch (e.g., the second switch 600-2a of FIG. 10).

According to various embodiments of the disclosure, an electronic device (e.g., the electronic device 101 of FIGS. 1 to 3) may comprise a housing, a wireless communication circuit disposed in the housing, a circuit board disposed in the housing, a conductive member disposed in at least a portion of the housing and configured to resonate in a first frequency band or a second frequency band higher than the first frequency band, a capacitor disposed on at least a portion of the circuit board, a first and second conductive pad disposed on at least a portion of the circuit board, and a plurality of conductive paths disposed on at least a portion of the circuit board and electrically connecting the wireless communication circuit, the conductive member, the capacitor, and the first and second conductive pad. At least some of the plurality of conductive paths may branch from the plurality of conductive paths disposed between the capacitor and the wireless communication circuit to electrically connect the wireless communication circuit and the second conductive pad. The first and second conductive pads may be coupled to allow the conductive member to resonate in the second frequency band.

According to various embodiments of the disclosure, the conductive member may include a side member formed of an antenna radiator.

According to various embodiments of the disclosure, the plurality of conductive paths may include a first, second, and third conductive path. The first conductive path may electrically connect the wireless communication circuit and the conductive member. The second conductive path may be electrically connected to the first conductive path between the wireless communication circuit and the capacitor. The third conductive path may electrically connect the first conductive path and the second conductive path.

According to above-described embodiments of the disclosure, as a second conductive path, which is electrically connected with a first conductive path between a wireless communication circuit and a capacitor, is included on at least a portion of a circuit board, the second conductive path may supply current from the wireless communication circuit to the second conductive pad without passing through the capacitor, and an antenna may thus enhance the antenna efficiency and performance in the second frequency band and exert stable radiation performance.

The wireless communication circuit may also supply a stable current to the first conductive pad, enhancing the antenna efficiency and performance even in the first frequency band.

It is apparent to one of ordinary skill in the art that an electronic device including an antenna as described above according to various embodiments of the disclosure is not limited to the above-described embodiments and those shown in the drawings, and various changes, modifications, or alterations may be made thereto without departing from the scope of the disclosure.

While the disclosure has been particularly shown and described with reference to exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a housing including a conductive member;
a wireless communication circuit;
a circuit board;
a first conductive path disposed on at least a portion of the circuit board and electrically connected with the wireless communication circuit;
a first capacitor disposed on the first conductive path;
a second conductive path disposed on at least a portion of the circuit board and electrically connected with the first conductive path between the wireless communication circuit and the first capacitor;
a first conductive pad electrically connected with the first conductive path;
a second conductive pad electrically connected with the second conductive path and coupled with the first conductive pad; and
a conductive connection member electrically connecting the first conductive pad and the conductive member,
wherein the conductive member is configured to resonate in a first frequency band or a second frequency band that is higher than the first frequency band.

2. The electronic device of claim 1, further comprising a first impedance circuit unit electrically connected to the first conductive path between the first capacitor and the first conductive pad, electrically connected to a ground, and including at least one of a second capacitor or a first inductor.

3. The electronic device of claim 2, further comprising a third conductive path electrically connected with the second conductive pad and the ground, and
a second impedance circuit unit disposed on the third conductive path and including at least one of a third capacitor or a second inductor.

4. The electronic device of claim 3, wherein the first impedance circuit unit further includes a first switch to switch between a first plurality of frequency bands, and
wherein the second impedance circuit unit further includes a second switch to switch between a second plurality of frequency bands.

5. The electronic device of claim 1, wherein the conductive member includes at least one of a metal frame radiator, a loop radiator, a monopole radiator, a laser direct structuring (LDS) radiator, or a pattern radiator.

6. The electronic device of claim 1, wherein the conductive connection member includes at least one of a C-clip, a flexible conductive member, a pogo pin, a screw, or a spring.

7. The electronic device of claim 1, wherein the first frequency band includes a 2.4 GHz Wi-Fi frequency band, and
wherein the second frequency band includes a 5.0 GHz Wi-Fi frequency band.

8. The electronic device of claim 1, wherein the first capacitor includes at least one of a low capacitor or a high capacitor.

9. An electronic device, comprising:
a housing including a first conductive member;
a wireless communication circuit;
a circuit board;
a first conductive path disposed on at least a portion of the circuit board and electrically connected with the wireless communication circuit;
a first capacitor disposed on the first conductive path;
a second conductive path disposed on at least a portion of the circuit board and electrically connected with the first conductive path between the wireless communication circuit and the first capacitor;
a second capacitor disposed on the second conductive path;
a second conductive member electrically connected to the second conductive path; and
a conductive connection member electrically connecting the first conductive member and a first conductive pad electrically connected to the first conductive path,
wherein the first conductive member is configured to resonate in a first frequency band, and
wherein the second conductive member is configured to resonate in a second frequency band.

10. The electronic device of claim 9, wherein the first capacitor includes a low capacitor and the second capacitor includes a high capacitor, or the first capacitor includes the high capacitor and the second capacitor includes the low capacitor.

11. The electronic device of claim 9, further comprising a first impedance circuit unit electrically connected to the first conductive path between the first capacitor and the conductive connection member, electrically connected to a ground, and including at least one of a third capacitor, a first inductor, or a first switch, and
a second impedance circuit unit electrically connected to the second conductive path between the second capacitor and the second conductive member, electrically connected to the ground, and including at least one of a fourth capacitor, a second inductor, or a second switch.

12. The electronic device of claim 9, further comprising a third conductive path disposed on at least a portion of the circuit board and electrically connected with the first conductive path between the wireless communication circuit and the first capacitor;
  a third conductive member electrically connected to the third conductive path;
  a third capacitor disposed on the third conductive path; and
  a third impedance circuit unit electrically connected to the third conductive path between the third capacitor and the third conductive member, electrically connected to the ground, and including at least one of a fourth capacitor, an inductor, or a switch.

13. The electronic device of claim 12, wherein the first conductive member includes at least one of a metal frame radiator, a loop radiator, a monopole radiator, a patch antenna, or an LDS radiator, and
  wherein the second and third conductive members include at least one of a laser direct structuring (LDS) radiator, a pattern radiator, or a loop radiator.

14. An electronic device, comprising:
  a housing first and second conductive members,
  a wireless communication circuit;
  a circuit board;
  a first conductive path disposed on at least a portion of the circuit board and electrically connected with the wireless communication circuit;
  a first capacitor disposed on the first conductive path;
  a second conductive path disposed on at least a portion of the circuit board and electrically connected with the first conductive path between the wireless communication circuit and the first capacitor;
  a second capacitor disposed on the second conductive path;
  a first conductive connection member electrically connecting the first conductive member and a first conductive pad electrically connected to the first conductive path; and
  a second conductive connection member electrically connecting the second conductive member and a second conductive pad electrically connected to the second conductive path,
  wherein the first conductive member is configured to resonate in a first frequency band or a second frequency band that is higher than the first frequency band, and
  wherein the second conductive member is configured to resonate in the second frequency band.

15. The electronic device of claim 14, wherein the first and second conductive members each include a metal frame radiator.

16. The electronic device of claim 14, further comprising a first impedance circuit unit electrically connected to the first conductive path between the first capacitor and the first conductive connection member, electrically connected to a ground, and including at least one of a third capacitor, a first inductor, or a first switch; and
  a second impedance circuit unit electrically connected to the second conductive path between the second capacitor and the second conductive connection member, electrically connected to the ground, and including a fourth capacitor, a second inductor, or a second switch.

* * * * *